US009226181B2

(12) United States Patent
Breed

(10) Patent No.: US 9,226,181 B2
(45) Date of Patent: Dec. 29, 2015

(54) SYSTEM AND METHOD FOR CELLULAR CONNECTION SELECTION

(71) Applicant: Tyco Safety Products Canada Ltd., Concord (CA)

(72) Inventor: Jason A. Breed, Richmond Hill (CA)

(73) Assignee: TYCO SAFETY PRODUCTS CANADA LTD., Concord (CA)

(*) Notice: Subject to any disclaimer, the term of this patent is extended or adjusted under 35 U.S.C. 154(b) by 90 days.

(21) Appl. No.: 13/798,858

(22) Filed: Mar. 13, 2013

(65) Prior Publication Data
US 2014/0274028 A1    Sep. 18, 2014

(51) Int. Cl.
   *H04M 11/04*   (2006.01)
   *H04W 24/04*   (2009.01)
   *H04W 12/00*   (2009.01)

(52) U.S. Cl.
   CPC ............. *H04W 24/04* (2013.01); *H04W 12/00* (2013.01)

(58) Field of Classification Search
   CPC ..... H04W 24/00; H04W 24/02; H04W 24/04; H04W 76/007; H04W 76/027; H04W 76/028; H04W 36/38; H04W 36/0055; H04W 36/0061; H04W 36/0083; H04W 36/14; H04W 36/165
   USPC ............. 455/423, 436, 438, 404.1, 512, 513, 455/67.11, 67.13, 115.1, 115.3, 226.1, 455/226.2, 404.2
   See application file for complete search history.

(56) References Cited

U.S. PATENT DOCUMENTS

| 5,761,619 | A | * | 6/1998 | Danne et al. | ................ | 455/422.1 |
| 2009/0061877 | A1 | * | 3/2009 | Gallagher et al. | ............ | 455/436 |
| 2009/0323904 | A1 | * | 12/2009 | Shapiro et al. | .................. | 379/39 |
| 2013/0009771 | A1 | | 1/2013 | Simon et al. | | |
| 2013/0089039 | A1 | * | 4/2013 | Vashi et al. | ................... | 370/329 |
| 2014/0179257 | A1 | * | 6/2014 | Petite | ......................... | 455/404.1 |

FOREIGN PATENT DOCUMENTS

| CA | 2834298 A1 | 1/2013 |
| WO | 03/065654 A1 | 8/2003 |

OTHER PUBLICATIONS

International Search Report and Written Opinion mailed Apr. 9, 2014 for PCT/ca2014/050043 filed Jan. 22, 2014.
Bhuvaneswari, et al., "An Overview of Vertical Handoff Decision Making Algorithms," I.J. Computer Network and Information Security, 2012, vol. 9, p. 55-62.

* cited by examiner

*Primary Examiner* — Temica M Beamer
(74) *Attorney, Agent, or Firm* — Kacvinsky Daisak Bluni PLLC

(57) ABSTRACT

A system and method are disclosed for transferring security event data over one of a plurality of cellular networks of different cellular carrier. A minimum acceptable signal quality for a connection between a radio transceiver and a cellular network is set. The signal quality for a connection between the radio transceiver and each of a plurality of cellular network receivers for the different cellular carriers is then determined. The radio transceiver is connected to the cellular network receiver for the cellular carrier exhibiting the greatest signal quality above the minimum acceptable signal quality. If this connection fails or is lost, the radio transceiver is connected to the cellular network receiver for an alternate cellular carrier exhibiting the next greatest acceptable signal quality above the minimum acceptable signal quality. Security event data is then transmitted from the radio transceiver to a remote central monitoring facility over the established cellular connection.

32 Claims, 4 Drawing Sheets

200

300

400

500

SYSTEM AND METHOD FOR CELLULAR CONNECTION SELECTION

FIELD OF THE INVENTION

Embodiments of the invention relate to the field of fault detection for security system event transmissions. More particularly, embodiments relate to a system and method for ensuring security system event data is relayed to a remote central monitoring facility over a cellular network connection.

DISCUSSION OF RELATED ART

Typical building alarm systems often include a number of notification appliances positioned throughout a structure to alert occupants of various emergencies. These notification appliances may include smoke detectors, fire alarms, security alarms, emergency lighting, strobe lighting, and the like. In addition to these notification appliances, building alarm systems may include components, such as a communications interface, that provide a communications link between the building in which the alarm system is located and a receiver in a central monitoring facility that is geographically remote from the building. The communication link may accommodate both wireline and wireless transmission methods and media. The communication link may allow security event data to flow between the building alarm system and the central monitoring facility. The security event data may provide information about the status of the alarm system (e.g., that it is operational, that it has been armed, that it has been disarmed), or it may provide information about the status of one or more alarms or sensors in the building (e.g., that a window or door has been opened or that a smoke or fire detector is experiencing an alarm condition).

During regular security event data to the central monitoring facility there are sometimes instances in which the transmission is not successful. In cases where a wireline connection is down, the communications may revert to a wireless connection as a backup. Often there may not be a wireline connection at all. In these cases, wireless connectivity may be the means of communication between the security system and the remote central monitoring facility.

A communications interface for a typical alarm system may include a fixed cellular radio transceiver to perform voice and data communications between the building's security system and the remote central monitoring facility. The fixed cellular radio transceiver may implement one of a plurality of cellular network protocols (e.g., GSM or CDMA) that are operated by a plurality of cellular carriers. The fixed cellular radio transceiver may be operative to connect to a single cellular carrier. At times, the connection with that cellular carrier may be compromised leading to a scenario in which the fixed cellular radio transceiver may be non-communicable with the remote central monitoring facility leading to an interruption in the security monitoring service provided by the security company. In view of the foregoing, there is a need for an improved system for ensuring that security system event data is relayed to a remote central monitoring facility when the transmission medium is a cellular network of a cellular carrier that may experience connection issues with the fixed cellular radio transceiver.

SUMMARY OF THE INVENTION

The disclosed system increases the effectiveness and redundancy of cellular communications between a fixed cellular radio transceiver coupled with an on-site security system control panel and a remote central monitoring facility responsible for acting on received security event data.

A method is disclosed for transferring security event data over one of a plurality of cellular networks of different cellular carrier. A minimum acceptable signal quality for a connection between a radio transceiver and a cellular network is set. The signal strength for a connection between the radio transceiver and each of a plurality of cellular network receivers for the different cellular carriers is then determined. The radio transceiver is connected to the cellular network receiver for the cellular carrier exhibiting the greatest signal quality above the minimum acceptable signal quality. If this connection fails or is lost, the radio transceiver is connected to the cellular network receiver for an alternate cellular carrier exhibiting the next greatest acceptable signal quality above the minimum acceptable signal quality. Security event data is then transmitted from the radio transceiver to a remote central monitoring facility over the established cellular connection.

A component operable with a security system is disclosed for transferring security event data over one of a plurality of cellular networks of different cellular carrier. The component may be used with a security system comprising a plurality of alarms and an alarm panel associated with a monitored building, an application operative on a processor, and a receiver associated with a central monitoring facility. A non-transitory machine-readable storage medium may be encoded with a computer program code comprising the application such that, when the application is executed by a processor, the processor causes the performance of certain processes. These processes include setting a minimum acceptable signal quality for a connection between a fixed cellular radio transceiver and a cellular network receiver for a cellular carrier, determining a signal quality for a connection between the fixed cellular radio transceiver and each of a plurality of cellular network receivers for the different cellular carriers, establishing a connection between the fixed cellular radio transceiver and the cellular network receiver for the cellular carrier exhibiting the greatest signal quality above the minimum acceptable signal quality, and causing the fixed cellular radio transceiver to transmit the security event data to the remote central monitoring facility over the cellular network for the cellular carrier to which the fixed cellular radio transceiver is connected. Other embodiments are disclosed and described.

DESCRIPTION OF EMBODIMENTS

Figure 1:
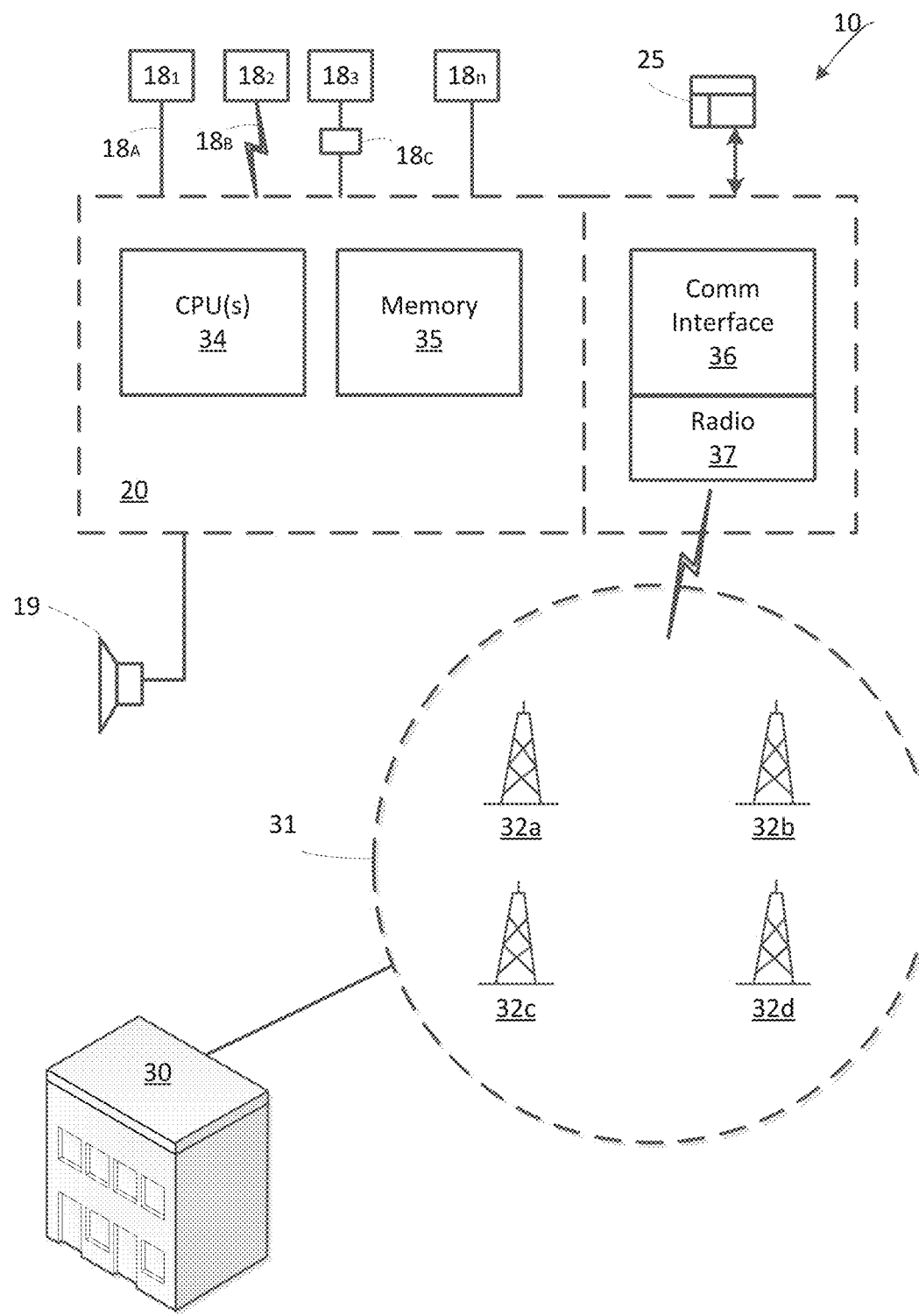
FIG. 1 is a block diagram of the system architecture according to an embodiment.

The present invention will now be described more fully hereinafter with reference to the accompanying drawings, in which preferred embodiments of the invention are shown. It will be appreciated, however, that the invention may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

In typical GSM cellular communication embodiments, for example, the radio transceiver controls the basestation tower, channel, and cellular carrier selections. The connection to various available carriers is entirely controlled by the public land mobile network (PLMN) list that is stored on the subscriber identity module (SIM) card housed in and operatively coupled with the radio transceiver. The PLMN list is a prioritized list of carriers that the radio transceiver adheres to when trying to establish a cellular connection. The prioritized list, however, often has nothing to do with the quality of the signal currently available from a particular location.

The radio transceiver for a security system utilizing a wireless connection is in a fixed location, namely the location in a building or structure determined during installation. Forced use of a prioritized PLMN list may cause problems if an unacceptable connection (e.g., weak signal strength) for the permanent installation of the radio transceiver is used. Often, there may be an alternate perfectly acceptable connection providing adequate signal strength available on another carrier which is of lower priority in the PLMN list. Such a situation could cause the radio transceiver to not be installed because of the unacceptable signal strength even when a perfectly good alternative cellular connection with another cellular carrier in the PLMN list exists.

In another scenario, the signal for the preferred carrier may be adequate at installation but may degrade post installation to unacceptable levels leaving the radio transceiver without an adequate cellular connection. In such cases it would be beneficial if the radio transceiver could switch to an alternate carrier in the PLMN list based on signal strength rather than a forced priority. Currently there are no techniques that have been implemented for application code in the radio transceiver to change carriers.

Previous security systems have let the radio transceiver control which cellular carrier and channel/frequency to which it connects. This is in part controlled by the data on the SIM card. This could cause the radio transceiver to connect to a suboptimal connection because once the radio transceiver has connected to a carrier as per the PLMN list in the SIM, the radio transceiver will not explore a potentially stronger signal level connection with a different carrier. With the ability to manage the carrier/connection status the radio transceiver can force selections of other cellular carriers in case of a failure on one of the cellular carrier networks.

The embodiments described herein provide the radio transceiver with the best alternative for finding an acceptable connection (e.g., acceptable signal strength) or to find a secondary cellular carrier connection when a primary cellular carrier connection is unsuccessful or lost. The selection of a cellular carrier may be made without regard to the prioritized PLMN list.

FIG. 1 is a block diagram of a typical security system 10 capable of implementing the embodiments of the present disclosure. The security system 10 may be installed in a building or premises. Security system 10 includes a control panel 20 which generally controls operation of the security system. A number of detection devices $18_1 \ldots 18n$ are utilized to monitor an area. Detection devices may include, for example, motion detectors, door contacts, glass break detectors, smoke detectors, water leakage detectors, etc. Detection devices $18_1 \ldots 18n$ may communicate with panel 20 by a wired interconnect $18_A$, wirelessly $18_B$, through the electric wiring of the premises $18_C$, or otherwise. One or more user interfaces, such as keypad 25 is used to communicate with control panel 20 to arm, disarm, notify and generally control security system 10. The security system 10 may further include other notification devices such as sirens, emergency lights, etc., referenced generally as 19.

Control panel 20 communicates with each of the detection devices $18_1 \ldots 18n$, keypad 25 and notification devices 19 as well as communicating with a monitoring facility 30 which is typically geographically remote from the premises in which system 10 is installed. Control panel 20 may include a CPU 34, memory 35 and communications interface 36. CPU 34 functions as a controller to control the various communication protocols within system 10. Memory 35 stores system parameters, detection device information, address information etc. Communications interface 36 sends and receives signals to/from a remote central monitoring facility 30 via a communications link 31. Alternatively, communications interface 36 may be a separate device that communicates with controller 20 via a hardwired or wireless connection.

When an alarm condition occurs based on the operation of one or more detection devices $18_1 \ldots 18n$, a signal is transmitted from the respective detection device to control panel 20. Depending on the type of signal received from the one or more detection devices, communications interface 36 communicates with monitoring facility 30 via link 31 to notify the monitoring facility that an alarm notification has occurred at the premises. Communication link 31 may be a POTS (Plain Old Telephone System), a broadband connection (e.g., Internet), a cellular network such as GSM (Global System for Mobile communications) transmission, a voice-over-IP (VoIP) connection, etc. In certain security systems, keypad 25, control panel 20 and communicator 36 may be housed within a single unit.

When the communications link 31 is a cellular network, a radio transceiver 37 is used to receive security event data from the communications interface 36 and transmit it to the remote central monitoring facility 30. The radio transceiver 37 is typically a cellular radio transceiver that has been installed in a fixed location within or about the building containing the security system 10. The radio transceiver 37 may be communicable with a plurality of cellular networks operated by a plurality of cellular carriers. For example, if the fixed cellular radio transceiver 37 is a GSM transceiver, it will include a SIM card. The SIM card will include a data file known as the PLMN list. The PLMN list is a prioritized list of cellular carriers to which the fixed cellular radio transceiver 37 may establish a connection. The fixed cellular radio transceiver 37 attempts to establish a connection with the first cellular carrier on the list. The next cellular carrier is attempted only if a connection cannot be established with the first cellular carrier. A weak connection is still considered a connection even if an alternate cellular carrier on the list offers a better signal strength connection. The cellular carriers may be represented in FIG. 1 by the basestation towers $32a$-$32d$. Each of $32a$-$32d$ represents a different cellular carrier that is communicable with the fixed cellular radio transceiver 37. The primary cellular carrier may be considered the home carrier while the others may be considered roaming cellular carriers only to be used when a connection to the home cellular carrier cannot be established. Each of the cellular carriers $32a$-$32d$ is also communicable with the remote central monitoring facility 30.

As noted above, keypad 25 is used to communicate with control panel 20 to arm, disarm, notify and generally control system 10. Keypad 25 includes a status display which may include either individual indicators, such as discrete light emitting diodes or may include a text and/or graphics display such as, for instance, an LCD or LED display, capable of displaying messages regarding the status of particular detection devices $18_1 \ldots 18n$ and/or operation of the system.

Each security system is given at least one unique access code (sometimes referred to as a PIN), which is generally a sequence of symbols (e.g. numbers, letters, characters, etc.) entered via keypad 25 used to arm and disarm system 10. When arming system 10, a user enters their access code and an exit delay time is provided before the detection devices 18$_1$ . . . 18n are activated so that a user may exit the premises before system 10 becomes armed. Conversely, upon entering the premises, the user enters the access code to disarm the system 10. An entry delay time period may be programmed into the system 10 to allow the user to enter the access code before the system goes into alarm mode.

Figure 2:
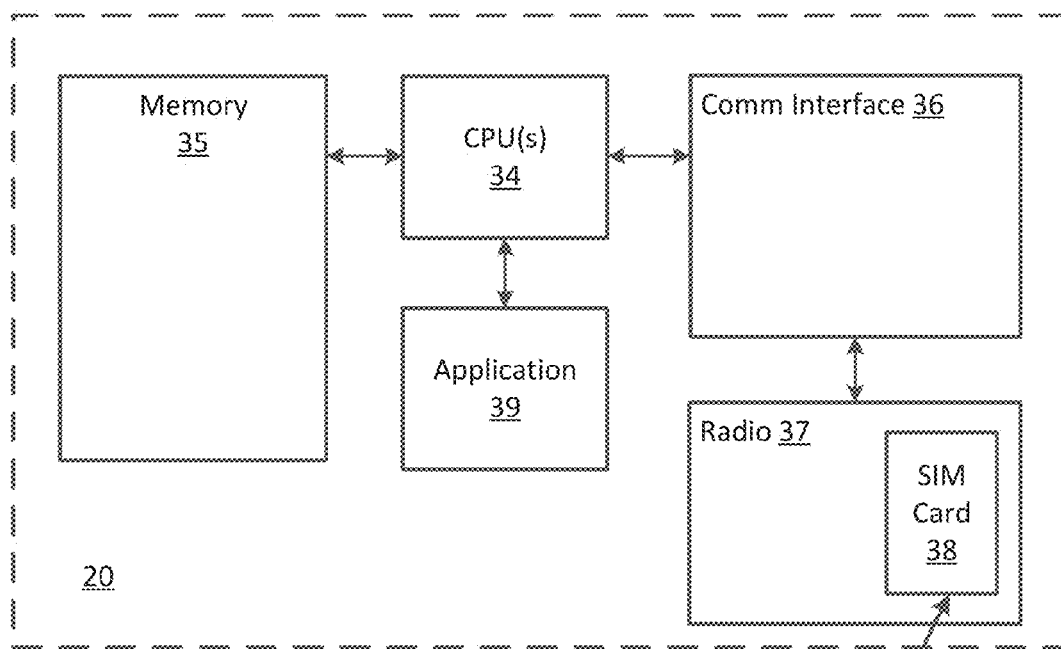
FIG. 2 is a block diagram of a security panel according to an embodiment.

FIG. 2 is a block diagram of a security panel 20 according to an embodiment. The security panel 20 is shown as housing the fixed cellular radio transceiver 37. This is not necessarily a requirement. The fixed cellular radio transceiver 37 may be physically de-coupled from the security panel but may still maintain communication with the security panel 20 so as to receive security event data to be transmitted to the remote central monitoring facility 30. A SIM card 38 is shown as being within the fixed cellular radio transceiver 37 as is typical of GSM radio units. The SIM card 38 may be seated within the fixed cellular radio transceiver 37 and electrically coupled with the other components of the fixed cellular radio transceiver 37 so as to allow access to the SIM card's 38 contents including the PLMN list 40.

An application 39 may be computer code operative on a processor such as CPU 34 and communicable with the fixed cellular radio transceiver 37 so as to access and control some of the fixed cellular radio transceiver 37 functions. Alternatively, the application may be stored by the fixed cellular radio transceiver 37 and operative on a processor component within the fixed cellular radio transceiver 37.

Figure 3:
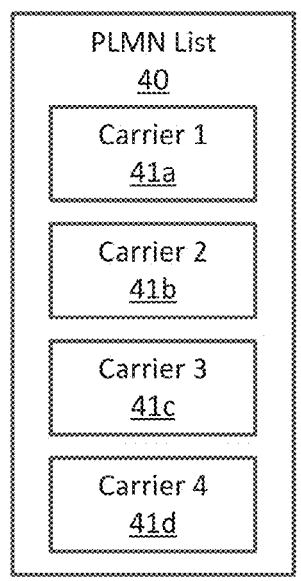
FIG. 3 is an example of cellular carrier data according to an embodiment.

FIG. 3 is an example of cellular carrier data stored by a fixed cellular radio transceiver 37 according to an embodiment. In this example, the cellular carrier data is a PLMN list 40 stored as a file on the SIM card 38. The PLMN list is a prioritized list of cellular carriers 41a-41d. Each record entry 41a-41d may include specific information identifying the cellular carrier, a basestation tower, and channel information that the fixed cellular radio transceiver 37 may use when establishing a connection with a particular cellular carrier 41a-41d. The fixed cellular radio transceiver 37 may be obligated to access the PLMN list 40 in a top down prioritized manner when establishing a cellular connection with the cellular network of a cellular carrier. Only if a connection to a cellular carrier higher on the list cannot be established will the fixed cellular radio transceiver 37 be permitted to attempt to establish a connection with a cellular carrier lower on the list. Certain priority data is provisioned on the SIM card prior to its installation on the fixed cellular radio transceiver 37. The SIM card data may be updated if the fixed cellular radio transceiver 37 were to change locations as is normal for a mobile phone. But since the fixed cellular radio transceiver 37 is stationary, the PLMN list data may not be altered unless new basestations are discovered within the range of the fixed cellular radio transceiver 37.

Figure 4:
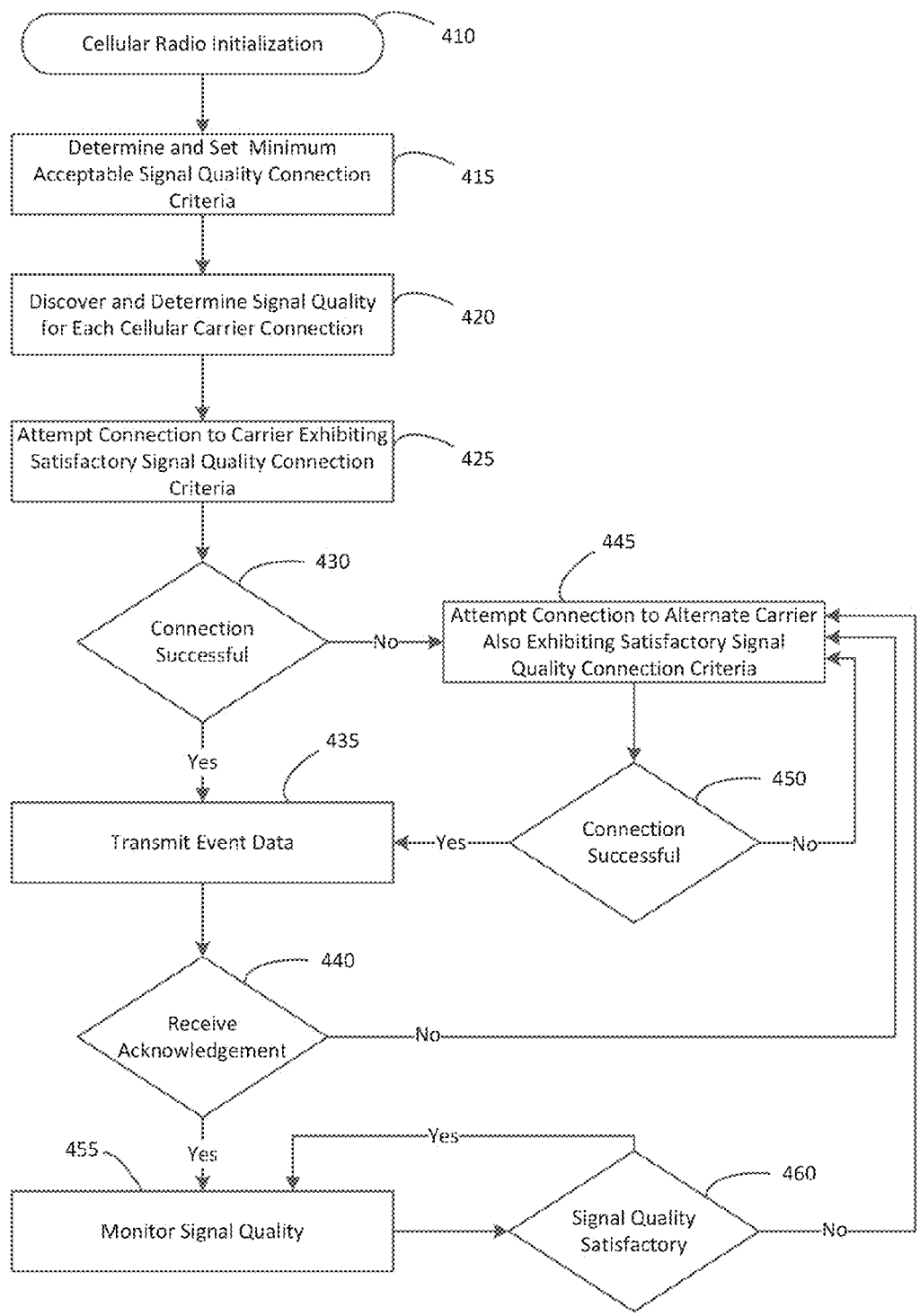
FIG. 4 is one embodiment of a logic flow.

FIG. 4 illustrates one embodiment of a logic flow 400. Logic flow 400 may be representative of the operations executed by one or more embodiments described herein. As shown in FIG. 4, the logic flow 400 may initialize a fixed cellular radio transceiver 37 for a cellular connection at block 410. For example, the cellular connection may be initiated during an installation process when the fixed cellular radio transceiver 37 is being installed in a building including a security system 10. Alternatively, the cellular connection may be initiated in response to a failure of a wireline causes a switchover to a cellular backup.

The logic flow 400 may determine minimum acceptable signal quality connection criteria at block 415. For example, the application 39 may include code that sets a quality control parameter to ensure that cellular communications between the fixed cellular radio transceiver 37 and the remote central monitoring facility are viable and satisfactory. In one embodiment, the quality control parameter may be a signal strength set at a pre-determined minimum received signal strength indication (RSSI) power level below which a connection to the cellular network is not recommended. In another embodiment, the quality control parameter may be based on the bit error rate (BER). BER is the number of bit errors out of all of the received bits of a data stream over a communication channel that have been altered due to noise, interference, distortion or bit synchronization errors. BER is often expressed as a percentage by dividing the number of bit errors by the total number of bits received. The quality control parameter may be set at a specific BER above which the connection may be considered unsatisfactory.

The logic flow 400 may discover one or more cellular carriers and determine the signal quality for each cellular carrier to which it can connect at block 420. For example, the application 39 may invoke commands available to the fixed cellular radio transceiver 37 that can query for available signals and cellular carriers. The application may then rank the available cellular carriers according to the signal quality control parameter(s) they are currently exhibiting. In one embodiment, the application 39 may determine the RSSI value associated with each cellular carrier and rank the cellular carriers accordingly. The RSSI value is indicative of the received signal strength measured in dBm of the fixed cellular radio transceiver 37 in its communications with a basestation within cellular network. In another embodiment, the application 39 may determine the BER associated with each cellular carrier and rank the cellular carriers accordingly. In yet another embodiment, the application 39 may determine both the RSSI value and BER associated with each cellular carrier and rank the cellular carriers accordingly.

The fixed cellular radio transceiver 37 may update itself by periodically repeating this step to determine if new cellular carriers have come on-line or if the connection quality for a existing cellular carriers has changed. Each cellular network that has been discovered may be stored regardless of the quality of the connection.

The logic flow 400 may attempt to establish a connection to the carrier exhibiting satisfactory signal quality connection criteria above the minimum acceptable signal quality connection criteria defined by the quality control parameter(s) at block 425. For example, the application 39 may instruct the fixed cellular radio transceiver 37 to establish a connection with the cellular network receiver for the cellular carrier exhibiting the a satisfactory signal strength above the minimum acceptable signal strength, a satisfactory BER below the maximum allowed BER, or a combination of both. The cellular carrier chosen may not necessarily be the highest priority cellular carrier as indicated in the PLMN list 40. The application 39, however, may force the fixed cellular radio transceiver 37 to establish a connection with an alternate cellular carrier if the preferred cellular carrier according to the PLMN list 40 does not meet the minimum acceptable signal quality connection criteria.

If the connection is successfully established as indicated in block 430, the fixed cellular radio transceiver 37 may transmit security event data to the remote central monitoring facility 30 over the cellular network to which it is connected at block 435.

The logic flow 400 may await an acknowledgement message from the remote central monitoring facility 30 indicating that the remote central monitoring facility 30 received the security event data at block 440. If such an acknowledgement is received, the process concludes successfully. If, however, no acknowledgement is received within a set time period, the application 39 may cause the fixed cellular radio transceiver 37 to establish a connection to an alternate cellular carrier also exhibiting satisfactory signal quality connection criteria at block 445. Prior to forcing a new cellular connection, the application 39 may cause the fixed cellular radio transceiver 37 to re-transmit the security event data on the current connection a set number of times before determining that a new cellular connection is required if no acknowledgement is received.

If the application 39 determines that a new cellular connection is needed either because the original cellular connection could not be established at block 430 or because an acknowledgement was never received at block 440, the application 39 works its way down the available alternate cellular carriers in the PLMN list, for instance, according to minimum satisfactory signal quality connection criteria such as, for instance, signal strength (RSSI), BER, or both to establish a cellular connection at block 445 that the fixed cellular radio transceiver 37 can use to transmit security event data to the remote central monitoring facility 30. The process of finding an acceptable cellular network connection for a cellular carrier is repeated at blocks 445 and 450 until an acceptable connection can be made. Thereafter, the application 39 and fixed cellular radio transceiver 37 continue to monitor the signal quality of the available cellular carriers at block 455 and may attempt to establish a connection with any one of them that exhibits better signal quality at block 460 than the currently camped on cellular network.

Figure 5:
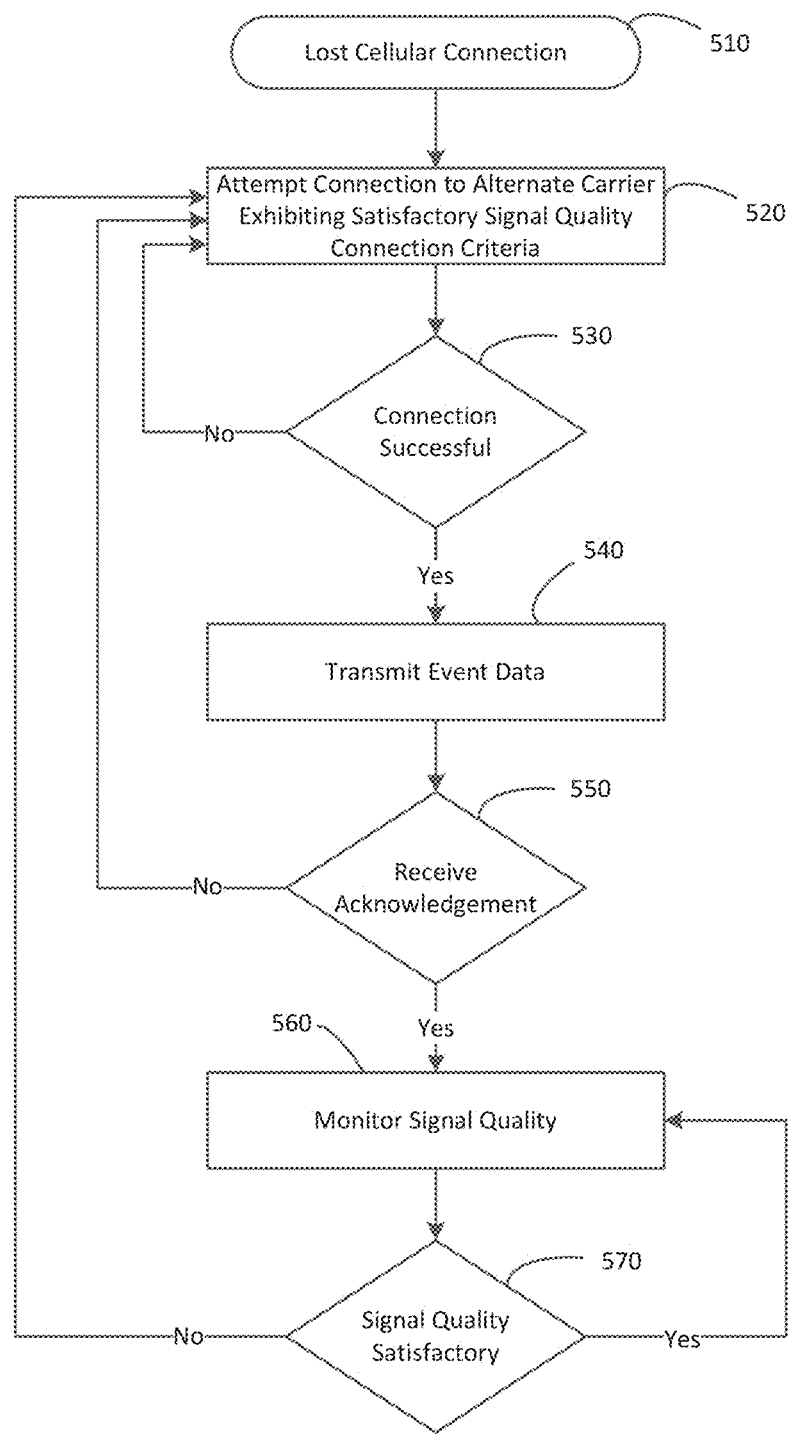
FIG. 5 is another embodiment of a logic flow.

Another embodiment is illustrated in the logic flow of FIG. 5. In this embodiment, the fixed cellular radio transceiver 37 has lost or dropped its connection with a cellular network at block 510.

If the application 39 determines that a new cellular connection is needed because the original cellular connection has been lost at block 510, the application works its way down the available cellular carriers in the PLMN list 40, for instance, according to signal strength (RSSI), BER or both to establish a cellular connection exhibiting satisfactory signal quality connection criteria at block 520. If the connection is successfully established at block 530, the fixed cellular radio transceiver 37 can transmit security event data to the remote central monitoring facility 30 at block 540.

The logic flow 500 may await an acknowledgement message from the remote central monitoring facility 30 indicating that the remote central monitoring facility 30 received the security event data at block 550. If such an acknowledgement is received, the process concludes successfully. If, however, no acknowledgement is received within a set time period, the application 39 may cause the fixed cellular radio transceiver 37 to establish a connection to an alternate cellular carrier exhibiting satisfactory signal quality connection criteria at block 520. Prior to forcing a new cellular connection, the application 39 may cause the fixed cellular radio transceiver 37 to re-transmit the security event data on the current connection a set number of times before determining that a new cellular connection is required if no acknowledgement is received.

If the connection attempt at block 530 was unsuccessful, the application 39 may cause the fixed cellular radio transceiver 37 to establish a connection to an alternate cellular carrier exhibiting satisfactory signal quality connection criteria back at block 520.

The process of finding an acceptable cellular network connection for a cellular carrier is repeated until an acceptable connection can be made. Thereafter, the application 39 and fixed cellular radio transceiver 37 continue to monitor the signal quality of the available cellular carriers at blocks 560, 570 and may attempt to establish a connection with any one of them that exhibits a greater signal quality than the currently camped on cellular network at block 520.

The systems and processes of FIGS. 1-5 are not exclusive. Other systems, processes and menus may be derived in accordance with the principles of the invention to accomplish the same objectives. Although this invention has been described with reference to particular embodiments (e.g., a GSM cellular radio and network), it is to be understood that the embodiments and variations shown and described herein are for illustration purposes only. Modifications to the current design may be implemented by those skilled in the art, without departing from the scope of the invention to include, for instance an implementation for a CDMA cellular radio and network.

The processes and applications may, in alternative embodiments, be located on one or more (e.g., distributed) processing devices accessing a network linking the elements of FIGS. 1 and 2. Further, any of the functions and steps provided in FIGS. 4-5 may be implemented in hardware, software or a combination of both and may reside on one or more processing devices located at any location of a network linking the elements of FIGS. 1 and 2 or another linked network, including the Internet.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of transferring security event data over one of a plurality of cellular networks of different cellular carriers, comprising:

setting, at a control panel of a security system, a minimum acceptable signal quality connection criteria for a connection between a fixed cellular radio transceiver and a cellular network receiver for a cellular carrier, wherein the minimum acceptable signal quality connection criteria is determined by a software application executed by a processor of the control panel;

determining a signal quality for a connection between the fixed cellular radio transceiver and each of a plurality of cellular network receivers for the different cellular carriers;

connecting the fixed cellular radio transceiver to a cellular network receiver for a first cellular carrier exhibiting an acceptable signal quality;

connecting the fixed cellular radio transceiver to a cellular network receiver for an alternate cellular carrier exhibiting an acceptable signal quality when a connection to the first cellular carrier cannot be established; and transmitting security event data from the fixed cellular radio transceiver to a remote central monitoring facility over a cellular network for the cellular carrier to which the fixed cellular radio transceiver is connected.

2. The method of claim 1, further comprising:
connecting the fixed cellular radio transceiver to a cellular network receiver for an alternate cellular carrier exhibiting an acceptable signal quality when an acknowledgement of the transmitted security event data is not received by the fixed cellular radio transceiver; and
transmitting the security event data from the fixed cellular radio transceiver to the remote central monitoring facility over the cellular network for the alternate cellular carrier.

3. The method of claim 1, wherein the fixed cellular radio transceiver is coupled with a security system panel.

4. The method of claim 1, further comprising:
repeatedly attempting to connect the fixed cellular radio transceiver to a cellular network receiver for a cellular carrier exhibiting an acceptable signal quality until a connection is established; and
transmitting the security event data from the fixed cellular radio transceiver to the remote central monitoring facility over the cellular network for the cellular carrier to which the fixed cellular radio transceiver is connected.

5. The method of claim 2, further comprising:
repeatedly attempting to connect the fixed cellular radio transceiver to a cellular network receiver for a cellular carrier exhibiting an acceptable signal quality when an acknowledgement of the transmitted security event data is not received by the fixed cellular radio transceiver until a connection is established; and
transmitting the security event data from the fixed cellular radio transceiver to the remote central monitoring facility over the cellular network for the cellular carrier to which the fixed cellular radio transceiver is connected.

6. The method of claim 1, further comprising:
losing the connection between the fixed cellular radio transceiver and the cellular network receiver for the cellular carrier to which the fixed cellular radio transceiver is connected;
connecting the fixed cellular radio transceiver to a cellular network receiver for an alternate cellular carrier exhibiting an acceptable signal quality; and
transmitting security event data from the fixed cellular radio transceiver to a remote central monitoring facility over a cellular network for the alternate cellular carrier to which the fixed cellular radio transceiver is connected.

7. The method of claim 6, further comprising:
connecting the fixed cellular radio transceiver to a cellular network receiver for another alternate cellular carrier exhibiting an acceptable signal quality when an acknowledgement of the transmitted security event data is not received by the radio transceiver; and
transmitting the security event data from the fixed cellular radio transceiver to the remote central monitoring facility over the cellular network for the another alternate cellular carrier.

8. The method of claim 7, further comprising:
repeatedly attempting to connect the fixed cellular radio transceiver to a cellular network receiver for another cellular carrier exhibiting an acceptable signal quality when the connection between the fixed cellular radio transceiver and the cellular network receiver for the cellular carrier to which the fixed cellular radio transceiver is connected is lost; and
transmitting the security event data from the fixed cellular radio transceiver to the remote central monitoring facility over the cellular network for the cellular carrier to which the fixed cellular radio transceiver is connected.

9. The method of claim 1, the signal quality being a signal strength measurement.

10. The method of claim 1, the signal quality being a bit error rate (BER) measurement.

11. The method of claim 1, wherein the plurality of different cellular carriers are in a prioritized order where the first cellular carrier occupies the highest priority and connections to the alternate cellular carriers are attempted according to their priority rank.

12. A component for transferring security event data over one of a plurality of cellular networks of different cellular carriers, the component for use with a security system comprising a plurality of alarms and an alarm panel associated with a monitored building, a receiver associated with a remote central monitoring facility, the component comprising:
a fixed cellular radio transceiver;
an application operative on a processor component of the alarm panel and communicatively coupled with the fixed cellular radio transceiver; and
a memory operative to store information pertaining to a plurality of cellular carriers that operate cellular networks;
the application operative to:
set a minimum acceptable signal quality for a connection between a fixed cellular radio transceiver and a cellular network receiver for a cellular carrier;
determine a signal quality for a connection between the fixed cellular radio transceiver and each of a plurality of cellular network receivers for different cellular carriers;
establish a connection between the fixed cellular radio transceiver and a cellular network receiver for a first cellular carrier exhibiting an acceptable signal quality; and
establish a connection between the fixed cellular radio transceiver and the cellular network receiver for an alternate cellular carrier exhibiting an acceptable signal quality when a connection to the first cellular carrier cannot be established; and
the fixed cellular radio transceiver operative to transmit security event data from the fixed cellular radio transceiver to the remote central monitoring facility over a cellular network for the cellular carrier to which the fixed cellular radio transceiver is connected.

13. The component of claim 12, wherein
the application is further operative to establish a connection between the fixed cellular radio transceiver and a cellular network receiver for an alternate cellular carrier exhibiting an acceptable signal quality when an acknowledgement of the transmitted security event data is not received by the fixed cellular radio transceiver; and
the fixed cellular radio transceiver is further operative to transmit the security event data to the remote central monitoring facility over the cellular network for the alternate cellular carrier.

14. The component of claim 12, wherein
the application is further operative to repeatedly attempt to establish a connection between the fixed cellular radio transceiver and a cellular network receiver for a cellular carrier exhibiting an acceptable signal quality until a connection is established; and
the fixed cellular radio transceiver is further operative to transmit the security event data from the fixed cellular radio transceiver to the remote central monitoring facility over the cellular network for the cellular carrier to which the fixed cellular radio transceiver is connected.

15. The component of claim 13, wherein
the application is further operative to repeatedly attempt to establish a connection between the fixed cellular radio transceiver and a cellular network receiver for a cellular carrier exhibiting an acceptable signal quality when an acknowledgement of the transmitted security event data is not received by the fixed cellular radio transceiver until a connection is established; and
the fixed cellular radio transceiver is further operative to transmit the security event data from the fixed cellular radio transceiver to the remote central monitoring facility over the cellular network for the cellular carrier to which the fixed cellular radio transceiver is connected.

16. The component of claim 12, wherein when the connection between the fixed cellular radio transceiver and the cellular network receiver for the cellular carrier is lost,
the application is further operative to connect the fixed cellular radio transceiver to a cellular network receiver for an alternate cellular carrier exhibiting an acceptable signal quality; and
the fixed cellular radio transceiver is further operative to transmit security event data from the fixed cellular radio transceiver to a remote central monitoring facility over a cellular network for the alternate cellular carrier to which the fixed cellular radio transceiver is connected.

17. The component of claim 16, wherein
the application is further operative to repeatedly attempt to establish a connection between the fixed cellular radio transceiver and another alternate cellular carrier exhibiting an acceptable signal quality when an acknowledgement of the transmitted security event data is not received by the radio transceiver; and
the fixed cellular radio transceiver is further operative to transmit the security event data from the fixed cellular radio transceiver to the remote central monitoring facility over the cellular network for the another alternate cellular carrier.

18. The component of claim 17, wherein
the application is further operative to repeatedly attempt to connect the fixed cellular radio transceiver to a cellular network receiver for another cellular carrier exhibiting an acceptable signal quality when the connection between the fixed cellular radio transceiver and the cellular network receiver for the cellular carrier to which the fixed cellular radio transceiver is connected is lost; and
the fixed cellular radio transceiver is further operative to transmit the security event data from the fixed cellular radio transceiver to the remote central monitoring facility over the cellular network for the cellular carrier to which the fixed cellular radio transceiver is connected.

19. The component of claim 12, wherein the signal quality is a signal quality measurement.

20. The component of claim 12, wherein the signal quality is a bit error rate (BER) measurement.

21. The component of claim 12, wherein the different cellular carriers are in a prioritized order where the first cellular carrier occupies the highest priority and connections to the alternate cellular carriers are attempted according to their priority rank.

22. A non-transitory machine-readable storage medium comprising instructions that when executed enable a system to:

set a minimum acceptable signal quality for a connection between a fixed cellular radio transceiver and a cellular network receiver for a cellular carrier;
determine a signal quality for a connection between the fixed cellular radio transceiver and each of a plurality of cellular network receivers for different cellular carriers;
connect the fixed cellular radio transceiver to a cellular network receiver for a first cellular carrier exhibiting an acceptable signal quality; and
connect the fixed cellular radio transceiver to a cellular network receiver for an alternate cellular carrier exhibiting an acceptable signal quality when a connection to the first cellular carrier cannot be established; and
transmit security event data from the fixed cellular radio transceiver to a remote central monitoring facility over a cellular network for the cellular carrier to which the fixed cellular radio transceiver is connected;
wherein the non-transitory machine-readable storage medium is a component of an alarm panel of a security system.

23. The non-transitory storage medium of claim 22, further comprising instructions that when executed enable the mobile computing system to:
connect the fixed cellular radio transceiver to a cellular network receiver for an alternate cellular carrier exhibiting an acceptable signal quality when an acknowledgement of the transmitted security event data is not received by the fixed cellular radio transceiver; and
transmit the security event data from the fixed cellular radio transceiver to the remote central monitoring facility over the cellular network for the alternate cellular carrier.

24. The non-transitory storage medium of claim 22, wherein the fixed cellular radio transceiver is coupled with a security system panel.

25. The non-transitory storage medium of claim 22, further comprising instructions that when executed enable the mobile computing system to:
repeatedly attempt to connect the fixed cellular radio transceiver to a cellular network receiver for a cellular carrier exhibiting an acceptable signal quality until a connection is established; and
transmit the security event data from the fixed cellular radio transceiver to the remote central monitoring facility over the cellular network for the cellular carrier to which the fixed cellular radio transceiver is connected.

26. The non-transitory storage medium of claim 23, further comprising instructions that when executed enable the mobile computing system to:
repeatedly attempt to connect the fixed cellular radio transceiver to a cellular network receiver for a cellular carrier exhibiting an acceptable signal quality when an acknowledgement of the transmitted security event data is not received by the fixed cellular radio transceiver until a connection is established; and
transmit the security event data from the fixed cellular radio transceiver to the remote central monitoring facility over the cellular network for the cellular carrier to which the fixed cellular radio transceiver is connected.

27. The non-transitory storage medium of claim 22, further comprising instructions that when executed enable the mobile computing system to:
connect the fixed cellular radio transceiver to a cellular network receiver for an alternate cellular carrier exhibiting an acceptable signal quality when the connection between the fixed cellular radio transceiver and the cellular network receiver for the cellular carrier to which the fixed cellular radio transceiver is connected is lost; and transmit security event data from the fixed cellular radio transceiver to a remote central monitoring facility over a cellular network for the alternate cellular carrier to which the fixed cellular radio transceiver is connected.

28. The non-transitory storage medium of claim 27, further comprising instructions that when executed enable the mobile computing system to:

connect the fixed cellular radio transceiver to a cellular network receiver for another alternate cellular carrier exhibiting an acceptable signal quality when an acknowledgement of the transmitted security event data is not received by the radio transceiver; and transmit the security event data from the fixed cellular radio transceiver to the remote central monitoring facility over the cellular network for the another alternate cellular carrier.

29. The non-transitory storage medium of claim 28, further comprising instructions that when executed enable the mobile computing system to:

repeatedly attempt to connect the fixed cellular radio transceiver to a cellular network receiver for another cellular carrier exhibiting an acceptable signal quality when the connection between the fixed cellular radio transceiver and the cellular network receiver for the cellular carrier to which the fixed cellular radio transceiver is connected is lost; and transmit the security event data from the fixed cellular radio transceiver to the remote central monitoring facility over the cellular network for the cellular carrier to which the fixed cellular radio transceiver is connected.

30. The non-transitory storage medium of claim 22, wherein the signal quality is a signal quality measurement.

31. The non-transitory storage medium of claim 22, wherein the signal quality is a bit error rate (BER) measurement.

32. The non-transitory storage medium of claim 22, wherein the different cellular carriers are in a prioritized order where the first cellular carrier occupies the highest priority and connections to the alternate cellular carriers are attempted according to their priority rank.

* * * * *